US009137247B2

(12) United States Patent
Smith et al.

(10) Patent No.: US 9,137,247 B2
(45) Date of Patent: Sep. 15, 2015

(54) TECHNOLOGIES FOR SECURE STORAGE AND USE OF BIOMETRIC AUTHENTICATION INFORMATION

(71) Applicant: Intel Corporation, Santa Clara, CA (US)

(72) Inventors: Ned M. Smith, Beaverton, OR (US); Conor P. Cahill, Waterford, VA (US); Micah J. Sheller, Hillsboro, OR (US); Jason Martin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,247

(22) PCT Filed: Mar. 15, 2013

(86) PCT No.: PCT/US2013/031881
§ 371 (c)(1),
(2) Date: Jun. 18, 2013

(87) PCT Pub. No.: WO2014/142941
PCT Pub. Date: Sep. 18, 2014

(65) Prior Publication Data
US 2014/0282945 A1 Sep. 18, 2014

(51) Int. Cl.
G06F 21/00 (2013.01)
G06F 11/30 (2006.01)
(Continued)

(52) U.S. Cl.
CPC ............ *H04L 63/0861* (2013.01); *G06F 21/32* (2013.01); *G06F 21/78* (2013.01)

(58) Field of Classification Search
None
See application file for complete search history.

(56) References Cited

U.S. PATENT DOCUMENTS 6,055,637 A * 4/2000 Hudson et al. .................. 726/20
7,039,951 B1 5/2006 Chaudhari et al.
(Continued)

FOREIGN PATENT DOCUMENTS

EP 1224518 B1 * 7/2009
KR 10-2011-0002967 A 1/2011
WO 2010/123385 A1 10/2010

OTHER PUBLICATIONS

Bare, J. Christopher, "Attestation and Trusted Computing", CSEP 590: Practical Aspects of Modern Cryptography, Mar. 2006, 10 Pages.

(Continued)

*Primary Examiner* — Fatoumata Traore
(74) *Attorney, Agent, or Firm* — Grossman, Tucker, Perreault & Pfleger, PLLC

(57) ABSTRACT

Generally, this disclosure describes technologies for securely storing and using biometric authentication information, such as biometric reference templates. In some embodiments, the technologies include a client device that stores one or more biometric reference templates in a memory thereof. The client device may transfer such templates to an authentication device. The transfer may be conditioned on verification that the authentication device includes a suitable protected environment for the templates and will execute an acceptable temporary storage policy. The technologies may also include an authentication device that is configured to temporarily store biometric reference templates received from a client device in a protected environment thereof. Upon completion of biometric authentication or the occurrence of a termination event, the authentication devices may delete the biometric reference templates from the protected environment.

24 Claims, 5 Drawing Sheets

(51) Int. Cl.
*H04L 29/06* (2006.01)
*G06F 21/32* (2013.01)
*G06F 21/78* (2013.01)

(56) References Cited

U.S. PATENT DOCUMENTS

| | | |
|---|---|---|
| 8,782,775 B2 | 7/2014 | Fadell et al. |
| 2003/0154406 A1 | 8/2003 | Honarvar et al. |
| 2003/0218534 A1 | 11/2003 | LaCous |
| 2004/0083394 A1 | 4/2004 | Brebner et al. |
| 2006/0156385 A1 | 7/2006 | Chiviendacz et al. |
| 2008/0019573 A1 | 1/2008 | Baltatu et al. |
| 2008/0263637 A1 | 10/2008 | Nonaka et al. |
| 2009/0063869 A1 | 3/2009 | Kohavi et al. |
| 2009/0199264 A1 | 8/2009 | Lang |
| 2010/0100947 A1 | 4/2010 | Ciet et al. |
| 2010/0246902 A1 | 9/2010 | Rowe et al. |
| 2011/0016534 A1 | 1/2011 | Jakobsson et al. |
| 2011/0068268 A1 | 3/2011 | Heidari |
| 2011/0224986 A1 | 9/2011 | Summerfield |
| 2011/0302653 A1 | 12/2011 | Frantz et al. |
| 2012/0159184 A1 | 6/2012 | Johnson et al. |
| 2012/0253930 A1 | 10/2012 | Gao et al. |
| 2013/0036480 A1 | 2/2013 | Anderson et al. |
| 2013/0038426 A1 | 2/2013 | Yamada |
| 2013/0047226 A1 | 2/2013 | Radhakrishnan et al. |
| 2013/0055348 A1 | 2/2013 | Strauss et al. |
| 2013/0067547 A1 | 3/2013 | Thavasi et al. |
| 2013/0074142 A1* | 3/2013 | Brennan et al. .................. 726/1 |
| 2013/0117804 A1* | 5/2013 | Chawla et al. .................. 726/1 |
| 2013/0167207 A1 | 6/2013 | Davis et al. |
| 2013/0198832 A1 | 8/2013 | Draluk et al. |
| 2013/0227700 A1 | 8/2013 | Dhillon et al. |
| 2013/0268994 A1 | 10/2013 | Cooper et al. |
| 2014/0156744 A1 | 6/2014 | Hua et al. |
| 2014/0250137 A1 | 9/2014 | Stout et al. |
| 2014/0282868 A1 | 9/2014 | Sheller et al. |
| 2014/0282893 A1 | 9/2014 | Sheller et al. |
| 2014/0366111 A1 | 12/2014 | Sheller et al. |

OTHER PUBLICATIONS

International Search Report and Written Opinion received for PCT Patent Application No. PCT/US2013/031881, mailed on Dec. 26, 2013, 10 pages.

International Search Report received for PCT Patent Application No. PCT/US2013/031919, mailed on Dec. 16, 2013, 3 pages.

International Search Report received for PCT Patent Application No. PCT/US2014/022327, mailed on Jul. 18, 2014, 3 pages.

International Search Report and Written Opinion received for PCT Patent Application No. PCT/US2014/029080, mailed on Jul. 31, 2014, 11 Pages.

Brickell, et al., "Direct Anonymous Attestation", CCS'04, Washington DC, Oct. 2004, pp. 132-145.

Brickell, et al., "Enhanced Privacy ID: A Direct Anonymous Attestation Scheme with Enhanced Revocation Capabilities", 6th Workshop of Privacy in the Electronic Society (WPES), Alexandria Virginia, Oct. 2007, pp. 21-30.

Krawczyk, Hugo, "SIGMA: the 'SIGn-and-MAc' Approach to Authenticated Diffie-Hellman and its Use in the IKE Protocols", EE Department, Technion, Haifa, Israel, and IBM T.J. Watson Research Center, 2003, pp. 399-424.

* cited by examiner

TECHNOLOGIES FOR SECURE STORAGE AND USE OF BIOMETRIC AUTHENTICATION INFORMATION

FIELD

The present disclosure generally relates to biometric authentication, and more particularly to technologies for securely storing and using biometric authentication information.

BACKGROUND

For the purpose of security and other reasons electronic devices, systems, and services may be protected by one or more authentication protocols such as a password authentication protocol. In an example password authentication protocol, an individual may supply a username and password to a service provider (e.g., his or her email provider). The service provider may store this information in association with the individual's account. When the individual wishes to access the account, he/she may log in to the service by providing his/her user name and password through a relevant portal such as a website or other application.

Although password authentication protocols are useful, they are becoming increasingly cumbersome as the number of user accounts and the need to use secure (e.g. complex and/or hard to remember) passwords increases. Such protocols also frequently require the storage of a username and password combination on a third party system such as an authentication server. Because authentication servers often store copious amounts of user account information, they may be considered a prime target for attack by malicious software and/or a hacker. If either or both of those entities successfully attack and gain access to the authentication server, the usernames and passwords stored in the server may be compromised.

Biometric authentication protocols have been considered as an alternative to password authentication protocols for user identity verification. Although useful, existing biometric authentication protocols may require users to provide reference templates including samples of their biometric information to a remote authentication agent such as an authentication server operated by an enterprise or third party authentication service. This may raise the same concerns as some password authentication protocols, in that a user's biometric reference templates may be compromised by a hacker or malicious software targeting the authentication server.

In addition, when a user provides a biometric reference template to a service provider, he/she may lose some or all control over that template and the information contained therein. Indeed, once reference biometric information is provided to a service provider, it may be difficult to for a user to revoke or otherwise delete that information from the service provider's systems. This may give rise to privacy and/or other concerns, particularly as the biometric information in a reference template may be considered personal private information of the user.

Local biometric authentication protocols have also been considered an option to password authentication protocols. In an example local biometric authentication protocol, authentication is performed by a local (client) device based on biometric reference templates stored in its memory, rather than on a centralized authentication server operated by a service provider. In such instances, the local device may attempt to verify user identity by comparing biometric test information obtained from the user with sensors available to the local device, and comparing the biometric test information against the biometric reference templates stored in the memory of the local device.

While local biometric authentication protocols are useful, such systems may still require substantially permanent storage of biometric reference templates in the client device. As a result, such systems may suffer from the same privacy concerns as a biometric authentication protocol that leverages a remote authentication server. These privacy concerns may be elevated in instances where the device performing the authentication may be easily lost and/or shared amongst multiple users, such as may be the case with mobile or other electronic devices that may be rented. Moreover, a client side biometric authentication protocol may not be capable of identifying a user unless the user has previously provided a biometric reference template to the client device performing the protocol.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
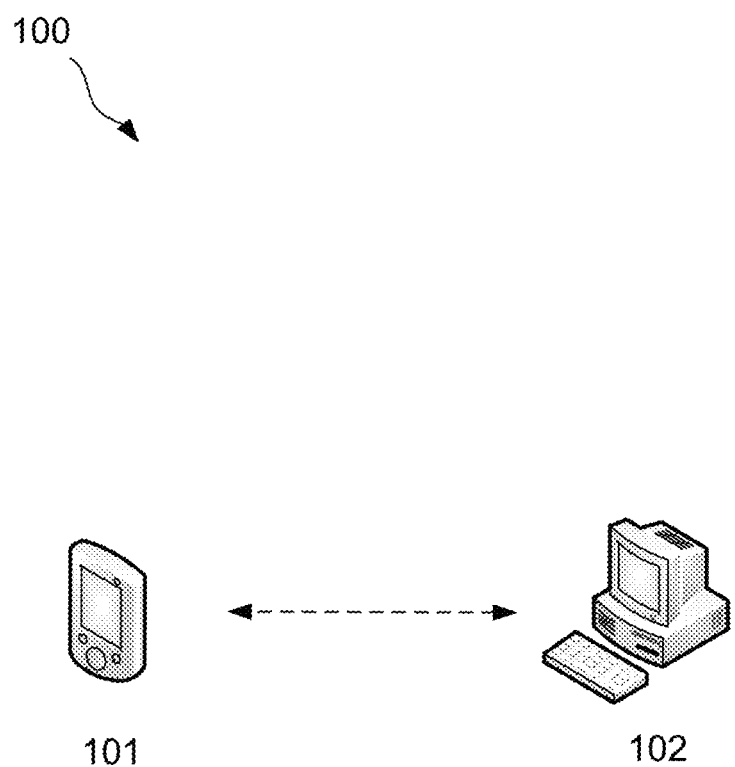
FIG. 1 depicts an example biometric authentication system consistent with the present disclosure.

Although the following detailed description will proceed with reference being made to illustrative embodiments, many alternatives, modifications, and variations thereof will be apparent to those skilled in the art.

DETAILED DESCRIPTION

The present disclosure relates to biometric authentication technology, including devices, systems and methods for biometric authentication. In general, the biometric authentication technology described herein leverages the use of biometric information that is stored in one or more templates on a client device. The client device may be a mobile or other electronic device that may remain under the control of a user that is the subject of the authentication, or a trusted third party.

As will be described in detail below, the client devices described herein may conditionally transfer one or more biometric reference templates to an authentication device for use in a biometric authentication operation. The transfer may be conditioned on successful verification by the client device that the authentication device will maintain the biometric reference templates in a protected environment (as defined below), and that the authentication device will delete the biometric reference templates upon the occurrence of a termination event, such as the expiration of a period of time or the termination of an authenticated user session. In this way, the biometric authentication technology described herein may maintain or enhance a user's control over his/her biometric reference information, by ensuring that biometric reference templates containing that information are only temporarily stored on authentication devices over which the user may have limited or no control (e.g., third party authentication devices/systems). This may alleviate or lower privacy concerns associated with traditional biometric authentication systems, which may require substantially permanent storage of biometric reference templates on authentication devices/systems over which a user has limited or no control.

As used herein, the term "authentication device" refers to any of the wide variety of mobile and other electronic devices that may perform biometric authentication operations consistent with the present disclosure. Non-limiting examples of suitable authentication devices include biometric authentication terminals, cameras, cell phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, ultra-mobile personal computers, wired telephones, combinations thereof, and the like. Such devices may be portable or stationary. Without limitation, the authentication devices described herein are preferably in the form of one or more biometric authentication terminals, cell phones, desktop computers, laptop computers, kiosks, servers, smart phones, tablet personal computers, and ultra-mobile personal computers.

The term "biometric information" is used herein to refer to observable physiological or behavioral traits of human beings (or other animals) that may be used to identify the presence of a human being (or other animal) and/or the identity of a specific human being (or other animal). Non-limiting examples of biometric information that may be used in accordance with the present disclosure include information regarding the biosignals (brain waves, cardiac signals, etc.), ear shape, eyes (e.g., iris, retina), deoxyribonucleic acid (DNA), face, finger/thumb prints, gait, hand geometry, handwriting, keystroke (i.e., typing patterns or characteristics), odor, skin texture, thermography, vascular patterns (e.g., finger, palm and/or eye vein patterns), and voice of a human (or other animal), combinations thereof, and the like. Such information may be detectable using one or more sensors, such as an optical or infrared camera, iris scanner, facial recognition system, voice recognition system, finger/thumbprint device, eye scanner, biosignal scanner (e.g., electrocardiogram, electroencephalogram, etc.), DNA analyzer, gait analyzer, combinations thereof, and the like. One or more of such sensors may be included in or coupled to the client devices and/or authentication devices described herein The term, "biometric reference template" is used herein to refer to a data structure containing biometric reference information of a user, particularly a user that is the target of a biometric authentication protocol.

The term "biometric reference information" is used herein to refer to biometric information of a user that is contained in a biometric reference template. In contrast, the term "biometric test information" is used herein to refer to biometric information that is obtained by an authentication device using one or more sensors pursuant to the performance of a biometric authentication protocol. As will be described below, the authentication devices described herein may perform a biometric authentication protocol that involves comparing biometric test information against biometric reference information contained in one or more biometric reference templates.

The terms "client" and "client device" are interchangeably used herein to refer to any of the wide variety of devices that may be used to securely store biometric reference templates, and transfer biometric reference templates to an authentication device for use in a biometric authentication operation. Any suitable mobile or other electronic device may be used as a client device, including those mentioned above as being suitable for use as an authentication device. Alternatively or additionally, the client devices described herein may be in the form of a smart card, an integrated circuit card, a universal serial bus key, a near field communication (NFC) device, combinations thereof, and the like. Without limitation, the authentication devices described herein are preferably in the form of a cellular phone, electronic reader, laptop computer, NFC enabled device, notebook computer, smart badge, smart card, smart phone, tablet personal computer, combinations thereof, and the like.

As will be described later, the client and authentication devices described herein may communicate with one another so as to enable the temporary transfer of biometric reference templates from a client device to an authentication device. Communication between such devices may be performed using close range communication, long range communication, or a combination thereof.

The phrases "close range communication" and "close range communications network" are used herein to refer to technologies for sending/receiving data signals over a wired or wireless interface between devices that are relatively close to one another. Close range communication includes, for example, communication between devices using a BLUETOOTH™ network, a personal area network (PAN), near field communication (NFC), a ZigBee network, a wired Ethernet connection, a wired or wireless universal serial bus (USB) connection, radio frequency identification (RFID), combinations thereof, and the like. Without limitation, the client and authentication devices described herein are preferably configured to communicate using near field communication.

In contrast, the phrases "long range communication" and "long range communications network" are used herein to refer to technologies for sending/receiving data signals between devices that are a significant distance away from one another. Long range communication includes, for example, communication between devices using a Wi-Fi network, a wide area network (WAN) including but not limited to a cell phone network (3G, 4G, etc. and the like), the internet, telephony networks, combinations thereof, and the like.

The client and/or authentication devices of the present disclosure may store one or more modules in a memory thereof. As used in any embodiment herein, the term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a client device or an authentication device.

The authentication devices described herein may include a protected environment for the storage of biometric reference templates. The term "protected environment" is used herein to refer to an execution environment within an authentication device, wherein the execution environment includes memory and processing resources that are isolated or otherwise protected from other components of the authentication device via hardware, firmware, software or a combination thereof.

Memory enclave technology is one example of a protected environment that may be used in an authentication device consistent with the present disclosure. Generally, a memory enclave may be made up of at least one memory page that has a different access policy than the access policy imposed by traditional ring boundaries of a computing system (in this case, an authentication device). The memory page(s) within a memory enclave may have associated read/write controls, which may be configured such that the read/write controls have exclusivity over certain operating modes or privilege "rings", such as system management mode or virtual machine monitors of an associated processor. Information stored and operations conducted within a memory enclave of an authentication device may therefore be isolated from other information, operations, and components of the authentication device. In some embodiments of the present disclosure, an authentication device includes one or more memory enclaves that are configured to temporarily store encrypted or unencrypted biometric reference templates provided by a client device for use in a biometric authentication process. One example of suitable memory enclave technology is Intel® Secure Enclave technology.

Another example of a protected environment that may be used in the authentication devices of the present disclosure is a trusted execution environment (TEE). Generally, a TEE is a secure environment that may run alongside an operating system and which can provide secure services to that operating system. More information regarding TEEs and the implementation thereof may be found in the TEE client application programming interface (API) specification v1.0, the TEE internal API (application programming interface) specification v1.0, and the TEE system architecture v1.0 issued by GlobalPlatform. In some embodiments, the authentication devices described herein include a TEE that was provided using one or more of virtualization technology, uCode enhanced memory page protection, CPU cache as memory page protection, security co-processor technology, and combinations thereof. Non-limiting examples of such technology include INTEL® VT-x virtualization technology, INTEL® VT-d virtualization technology, INTEL® trusted execution technology (TXT), Xeon internet security and acceleration (ISA) "cache as RAM", converged security engine (CSE) technology, converged security and manageability engine (CSME) technology, a security co-processor, manageability engine, trusted platform module, platform trust technology, ARM TRUSTZONE® technology, combinations thereof, and the like. The nature, advantages and limitations of each of these technologies are well understood and are therefore not described herein. In some embodiments of the present disclosure, the authentication devices described herein include a TEE that is configured to temporarily store biometric reference templates received from a client device for use in a biometric authentication process.

With the foregoing in mind, one aspect of the present disclosure relates to a biometric authentication system. Reference is therefore made to FIG. 1, which depicts an example biometric authentication system consistent with the present disclosure. As shown, system 100 includes client device 101 and authentication device 102. Client device 101 may be configured to store one or more biometric reference templates (not shown), and to conditionally transfer such templates to authentication device 102 for use in a biometric authentication operation. Authentication device 102 may be configured to receive biometric reference templates from client device 101, temporarily store such templates in a protected environment, use such templates in a biometric authentication operation, and delete such templates from the protected environment upon the occurrence of a termination event.

It is noted that for the sake of clarity and ease of understanding, device 101 and authentication device 102 are illustrated in FIG. 1 in the form of a smart phone and a computer system, respectively. Such illustration is for example only and it should be understood that client device 101 and authentication device 102 may be in the form of any suitable mobile or other electronic device, including those specified above as being suitable for use as client devices and authentication devices. Without limitation, client device 101 is preferably in the form of a cell phone, electronic reader, laptop computer, NFC enabled device, notebook computer, smart badge, smart card, smart phone, tablet personal computer, or ultra mobile personal computer. Also without limitation, authentication device 102 preferably forms all or a part of an authentication system that is protecting access to one or more physical or electronic resources.

Figure 2:
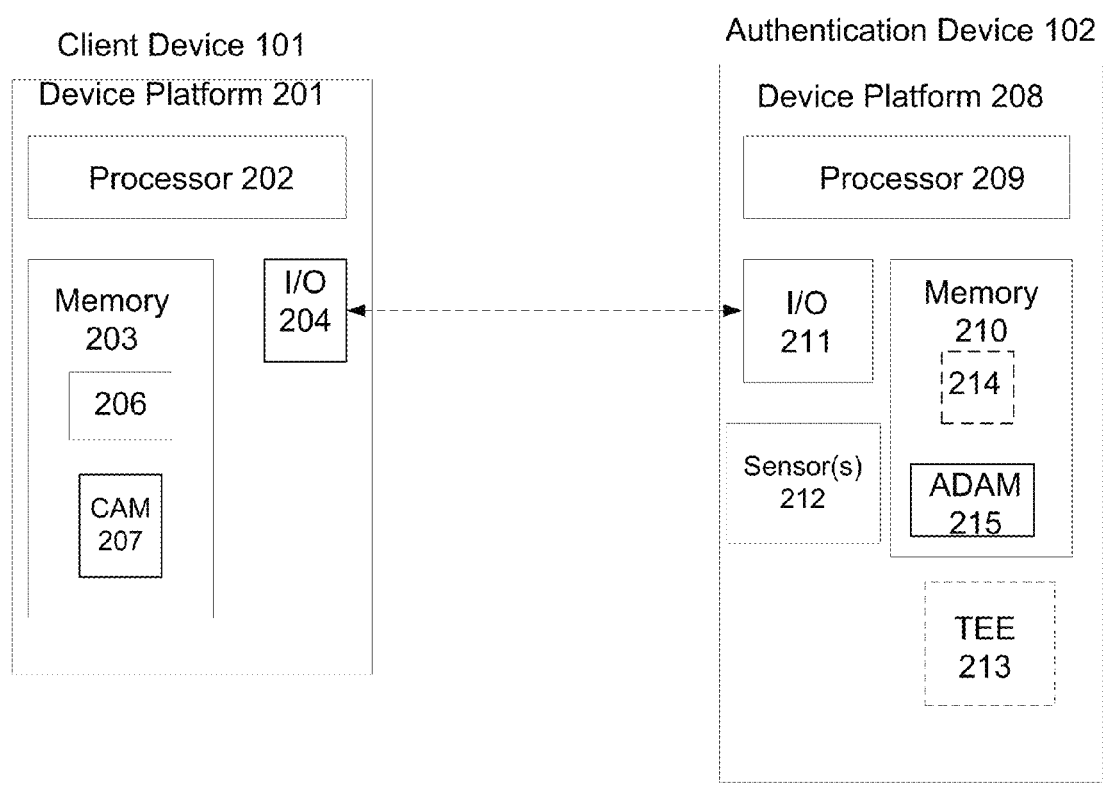
FIG. 2 is a block diagram illustrating an example of a device architecture for elements of a biometric authentication system consistent with the present disclosure.

FIG. 2 depicts an example device architecture for a client device and authentication device consistent with the present disclosure. As shown, client device 101 includes device platform 201 and authentication device 102 includes device platform 208. In general, device platforms 201 and 208 may be consistent with the form factor and/or type of mobile or other electronic device used as client device 101 and authentication device 102, respectively. For example, if client device 101 is in the form of a smart card and authentication device 102 is in the form of a retinal scanner, device platforms 201, 208 may be a smart card platform and a retinal scanner platform, respectively. Likewise, if client device 101 is in the form of a smart phone and authentication device 102 is in the form of a desktop computer, device platforms 201 and 208 may be a smart phone platform and a desktop computer platform, respectively. It should therefore be understood that device platforms 201 and 208 may correlate to any platform suitable for use in connection with the mobile and other electronic devices specified herein as being suitable for use as client device 101 and authentication device 102, respectively.

For the sake of clarity and ease of understanding, device platforms 201 and 208 have been illustrated in FIG. 2 with limited components. This illustration is for example only, and it should be understood that these device platforms may include other components, including components that may be traditionally found in a device platform corresponding to the type and nature of the mobile or other electronic device used as client device 101 and authentication device 102.

Device platforms 201 and 208 also respectively include processors 202, 209, memories 203, 210, and input/output interfaces (I/O) 204, 211. Any suitable processor may be used as processor 202 and/or processor 209, including but not limited to general purpose processors and application specific integrated circuits. Such processors may be capable of executing one or multiple threads on one or multiple processor cores. The type and nature of processors 202, 209 may be selected based on numerous factors such client/authentication device form factor, desired power consumption, desired processing capability, combinations thereof, and the like. Thus for example if client device 101 is a low power device such as a smart card or badge, processor 202 may be selected to support low power operation while providing sufficient processing capability for operations that will be performed by client device 101. Likewise, processor 209 may be selected based on similar criterion, as well as operational characteristics that may be desired for the type of device used as authentication device 102. Non-limiting examples of suitable processors that may be used as processors 202, 209 include the mobile and desktop processors commercially available from INTEL®, Advanced Micro Devices (AMD®), Apple®, Samsung®, and Nvidia®. Without limitation, processor 202 is preferably an Intel mobile processor or an application specific integrated circuit.

It should be understood that processor 202 may differ in type and operational characteristics from processor 209. For example, processor 202 may be a low power application specific integrated circuit, whereas processor 209 may be a single or multicore general purpose processor, such as a desktop or mobile device processor.

Memory 203 and memory 210 may be any suitable type of computer readable memory. Non-limiting examples of memory types that may be used as memory 203 and memory 210 include semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, memory 203 and/or memory 210 may include other and/or later-developed types of computer-readable memory. It should be understood that memory 203 and memory 210 need not be the same type of memory. For example, memory 203 may be or include flash memory, whereas memory 210 may be or include random access memory, magnetic memory, or a combination thereof.

Input output interfaces ("I/O") 204, 211 are generally configured to facilitate or otherwise enable communication between client device 101 and authentication device 102. In this regard, I/O 204 and I/O 211 may include hardware (i.e., circuitry), software, or a combination of hardware and software that allows client device 101 and authentication device 102 to send and receive data signals and information to one another. In particular, I/O 204 may include hardware, software, or a combination of hardware and software that enables client device 101 to receive attestation information (described below) from authentication device 102, and to transmit biometric reference templates to authentication device 102. Likewise, I/O 211 may include hardware, software, or a combination of hardware and software that allows authentication device 102 to receive biometric reference templates from client device 101, and to transmit attestation information to client device 101.

Communication between client device 101 and authentication device 102 may occur over a close and/or long range communications network using a predefined wired or wireless communications protocol. I/Os 204 and 211 may therefore include hardware, software, or a combination of hardware and software that enables communication between client device 101 and authentication device 102 in this manner. For example, I/Os 204 and 211 may include one or more transponders, antennas, BLUETOOTH™ chips, personal area network chips, near field communication chips, Wi-Fi chips, cellular antennas, combinations thereof, and the like. I/O 204 and I/O 211 may be preferably configured to enable client device 101 and authentication device 102 to communicate with each other using a mutually supported form of communication. In some embodiments, I/O 203 and I/O 211 mutually support communication via a close range communications technology such as NFC, a personal area network, a ZigBee network, combinations thereof, and the like. Without limitation, I/O 204 and I/O 211 are preferably configured to enable communication between client device 101 and authentication device 102 using NFC.

Client device 101 may also include one or more biometric reference templates 206. In the embodiment of FIG. 2, biometric reference templates 206 are illustrated as stored in memory 203 of client device 101. This illustration is for example only, and biometric reference templates 206 may be stored in any suitable memory of client 101. As will be described later, biometric reference templates 206 on client device 101 may be used to support biometric authentication operations performed by authentication device 102.

The authentication devices described herein may include or be coupled to at least one sensor that may be used to obtain biometric test information from a user for use in a biometric authentication protocol. This concept is illustrated in FIG. 2, wherein authentication device 102 is depicted as including sensor(s) 212. Any type of sensor or combination of sensors may be used as sensor(s) 212, provided that it/they can obtain biometric test information from a user in connection with the performance of a biometric authentication operation by authentication device 102. Non-limiting examples of such sensors include the sensors specified above as being suitable for the detection of biometric information. In some embodiments, sensor(s) 212 is/are selected from thumb print readers, hand print scanners, iris scanners, vascular pattern sensors, handwriting verification sensors, DNA sensors, image and voice recognition systems, accelerometers, gyroscopes, gait monitoring systems, thermographic sensors, biosignal (brain wave, cardiac sounds, electrocardiogram, etc.) sensors, odor sensors, skin texture sensors, combinations thereof, and the like. Without limitation, sensor(s) 212 are preferably configured to obtain biometric test information that is consistent withal or a portion of the biometric reference data in biometric reference templates provided by client device 101.

As noted previously the authentication devices described herein may include a protected environment for the temporary storage of biometric reference templates received from a client device. This concept is illustrated in FIG. 2, wherein authentication device 102 is depicted as including TEE 213 and memory enclave 214. While the present disclosure envisions authentication devices that include both TEE 213 and memory enclave 214, the combined use of those protected environments is not required. Indeed without limitation the authentication devices described herein are preferably configured to include either a TEE or a memory enclave as a protected environment for the storage of biometric reference templates. This concept is illustrated by the hashing of the boxes surrounding TEE 213 and memory enclave 214, which indicates that one or both of such protected environments may be included in authentication device 102.

For the sake of illustration memory enclave 214 is depicted in FIG. 2 as being included in memory 210. This illustration is for example only, and it should be understood that memory enclave 214 need not be provisioned within memory 210. Indeed, the memory enclaves described herein (including memory enclave 214) may be provisioned within memory that is separate from memory 210. Memory enclave 214 may for example be provisioned within memory local to processor 209, within memory local to TEE 213 (e.g., a security co-processor), combinations thereof, and the like.

FIG. 2 further illustrates client device 101 as including client authentication module (CAM) 207, and authentication device 102 as including authentication device attestation module (ADAM) 215. For the sake of illustration, CAM 207 and ADAM 215 are illustrated as components that are provisioned within memory 203 and memory 210, respectively, and which are separate from other elements of client device 101 and authentication device 102, respectively. Of course, such configuration is for example only, and CAM 207 and ADAM 215 may be respectively provisioned on client device 101 and authentication device 102 in any suitable manner. For example, CAM 207 may be provisioned as computer readable instructions within memory 203, within a hardware module (not shown) of device platform 201, within a memory local to processor 202, or a combination thereof. Likewise, ADAM 215 may be provisioned in the form of computer readable instructions within memory 210, within a memory (not shown) of TEE 213, within memory enclave 214, within memory local to processor 209, combinations thereof, and the like. In any case, CAM 207 and ADAM 215 may include computer readable instructions that when executed by processors 202, 208, respectively, cause client device 101 and/or authentication device 102 to perform operations consistent with the present disclosure, including biometric reference template exchange operations and biometric authentication operations.

Client device 101 may be configured to initiate a biometric authentication operation with authentication device 102. For example, CAM 207 when executed by processor 204 may cause client device 101 to transmit a biometric authentication initiation signal (BAIS; not shown) to authentication device 102, e.g., from I/O 204 to I/O 211 using close range communication, long range communication or a combination thereof. Without limitation, the BAIS is preferably communicated from client device 101 to authentication device 102 using a form of close range communication such as NFC. In such instances initiation of a biometric authentication protocol may take place once client device 101 is within NFC communication range of authentication device 102.

Regardless of the mode of communication, the BAIS may include a task certificate that includes a description of the task to be performed (e.g., biometric authentication of a particular user according to a particular standard), communication modes that are available to client device 101, the type of biometric reference information contained in biometric reference templates 206, or a combination thereof. For example, the BAIS may indicate that biometric authentication of a particular user is to be performed by authentication device using all or a portion of the biometric reference information in biometric reference templates 206.

The BAIS may also specify the characteristics of a protected environment that it requires for the temporary storage of biometric reference templates 206. For example, the BAIS may specify the use of a protected environment in the form of memory enclave, a TEE provided by virtualization, a TEE provided by a hardware module (e.g., trusted platform module), combinations thereof and the like. The BAIS may further specify the use of a protected environment having certain processing resources, memory, storage, input/output resources, combinations thereof, and the like, which may be needed to execute a specified biometric authentication operation. Likewise, the BAIS may specify the use of a protected environment that enforces a temporary storage policy in accordance with certain specified criterion. More specifically, the BAIS may specify the use of a protected environment that enforces a temporary storage policy that results in the deletion of biometric reference template information from the protected environment upon the occurrence of a termination event.

Authentication device 102 may be configured to perform certain operations in response to receiving a BAIS from client device 101. For example, ADAM 215 may include instructions that when executed by processor 209 may cause authentication device 102 to, in response to receiving a BAIS, send an attestation signal (not shown) to client 101, e.g., via I/O 211. In general, the attestation signal may include information that may affect client device 101's decision to permit or deny the transfer of biometric reference templates 206 to authentication device 102. For example, the attestation signal may include attestation information that attests to the protected environment(s) maintained on authentication device 102. Attestation information may include for example information regarding vendor, make, model, and/or version of TEE 213 and/or memory enclave 214. In additional, the attestation signal may provide information regarding a temporary storage policy enforced by the protected environment, i.e., information regarding the protected environment's willingness and/or capability to delete biometric reference templates (or other information) upon the occurrence of a termination event.

Client device 101 may evaluate the capabilities of authentication device 102 based on the attestation information contained in a received attestation signal. More specifically, CAM 207 when executed by processor 202 may cause client device 101 to analyze information in an attestation signal received from authentication device 102, e.g., against the protected environment criterion and/or temporary storage policy criterion specified in the BAIS. If client device 101 determines that authentication device 102 lacks an adequate protected environment and/or temporary storage policy, it may decline to transfer any or all of biometric reference templates 206 to authentication device 102, and the process may fail. Alternatively, client device 101 may revise the criteria specified in the BAIS for the protected environment on authentication device 101, and may reevaluate the capabilities of authentication device 102 based on the revised criteria.

In some embodiments, transmission of biometric reference templates from client device 101 to authentication device 102 may be conditioned on successful verification of the authenticity of authentication device 102, its protected environment, its temporary storage policy, or a combination thereof. Verification of authenticity may be carried out using one or more electronic signature protocols, such as the INTEL® Enhanced Privacy Identification (EPID) protocol, the direct autonomous attestation (DAA) protocol, a remote anonymous attestation (RAA) protocol, a SIGMA (sign and message authentication code (MAC)) protocol, combinations thereof, and the like combinations thereof, and the like.

As may be appreciated, EPID is a specialization of DAA with enhanced revocation properties. Details regarding the EPID and DAA protocols may be found in E. Brickell and Jiangtao Li, "Enhanced Privacy ID: A Direct Anonymous Attestation Scheme with Enhanced Revocation capabilities," Aug. 17, 2007 and Brickell et al., "Direct Autonomous Attestation," 11$^{th}$ ACM Conference on Computer and Communications Security, Oct. 25-29, 2004. Generally, EPID and DAA permit data to be signed with a private identification key (e.g., an EPID private key) that is unique to one device, and which may be verified using a corresponding public key (e.g., an EPID public key) that is distributed among various other devices. In some embodiments, the authentication devices described herein store a private key used in EPID or DAA in a protected environment such as TEE 213 and/or memory enclave 214, and the corresponding public key used to verify the private identification key is stored in a memory of client device 101.

One example of a suitable SIGMA protocol that may be used is the modified Sigma protocol described in "SIGMA, the Sign-and-Mac Approach to Authenticated Diffie-Hellman and its Use in the IKE protocol," Hugo Krawczyk, Proceedings of Crypto 2003, Springer-Verlag Lecture Notes in Computer Science No. 2729, p. 399.

In instances where verification of the authenticity of authentication device 102 is made using an electronic signature protocol, authentication device 102 may store one or more private keys (not shown) for such protocol, and client device 101 may store one or more public keys (not shown) corresponding to the private keys. Such keys may be stored in memory 210 and memory 203, respectively, or in another memory of authentication device 102 and client device 101. When executed by a processor such as processor 209, ADAM 215 may cause authentication device 102 to sign its attestation information with one or more of its private keys. The signed attestation information may then be transferred to client device 101.

In response to receiving signed attestation information from authentication device 102, client device 101 may verify the authenticity of authentication device 102 using its public keys. For example if authentication device 102 signs its attestation information with a DAA or EPID private key (e.g., stored in TEE 213 or memory enclave 214), CAM 207 when executed may cause client device 101 to verify the authenticity of the private key using a corresponding DAA or EPID public key (e.g., stored in memory 203).

Figure 5:
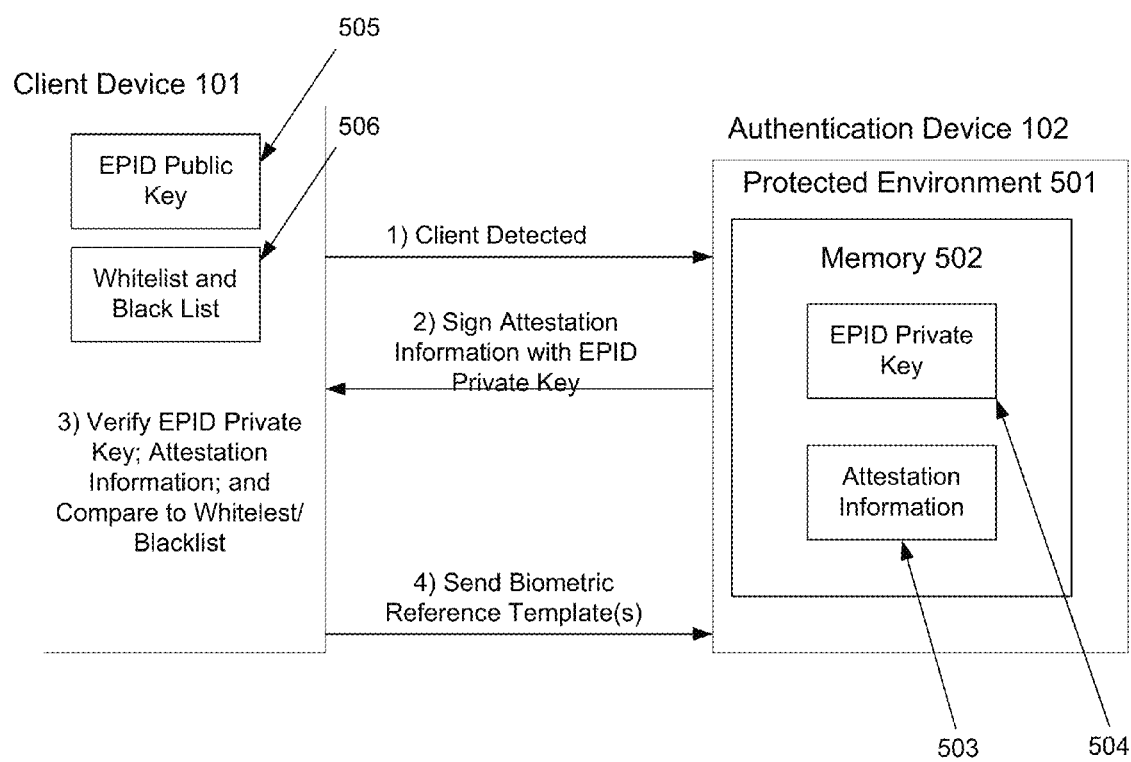
FIG. 5. depicts an example of an attestation flow that may be performed prior to the transfer of a biometric reference template from a client to an authentication agent, consistent with the present disclosure.

As one example of an attestation method in accordance with the present disclosure, reference is made to FIG. 5, which depicts an example attestation flow using EPID. As shown, the pairing protocol begins with operation 1, wherein client device 101 is detected by authentication device 102. Detection of client device 101 may occur in any suitable manner, and may flow from the establishment of a communications link between authentication device 102 and client device 101. The method may then proceed to operation 2, wherein authentication device 102 may sign attestation information 504 with EPID private key 504, which may be stored in memory 502 of a protected environment 501 (e.g., a TEE, memory enclave, or combination thereof) maintained on authentication device 102.

The method may then proceed to operation 3, wherein client device 101 verifies the EPID private key 504 and attestation information 503. In this instance, client device 101 may verify the EPID private key using a corresponding EPID public key 505, which may be stored in a memory of client device 101. Verification of the attestation information may be performed by comparing the content of attestation information 503 against a whitelist of acceptable protected environments and a blacklist of unacceptable protected environments, illustrated in FIG. 5 as whitelist and blacklist 506. If verification of the EPID private key and the attestation information succeeds, the method may proceed to operation 4, wherein the client device transmits one or more biometric reference templates to authentication device 102, as further described below.

It is noted that the method flow shown in FIG. 5 presumes that client device 101 is pre-provisioned with an EPID (or other suitable protocol) public key and that authentication device is pre-provisioned with an EPID (or other suitable protocol) private key. Such configuration is for example only, and public and private keys need not be pre-provisioned on client device 101 and authentication device 102, respectively. For example, client device 101 and authentication device may each include network connectivity circuitry (e.g., in I/O's 204, 211) that is configured to allow client device 101 and authentication device 102 to communicate with and obtain relevant keys from a remote certification authority (not shown). Communication with the remote certification authority may occur via close range communication, long range communication, or a combination thereof. In any case, it may be understood that the certification authority may provide relevant public/private keys and optionally other information (e.g., revocation lists, white lists, block lists, etc.) to client device 101 and authentication device 102.

Once client device 101 determines that a protected environment (and associated temporary storage policy) on authentication device 102 is adequate and upon successful validation of the authenticity of authentication device 102 (if required), client device 101 may communicate one or more of biometric reference templates 206 to authentication device 102. Communication of the biometric reference templates to authentication device 102 may occur via I/O 204 using any suitable mode of communication, including close range communication and long range communication. Without limitation, client device 101 preferably transmits one or more of biometric reference templates 206 to authentication device 102 using a mutually supported close range communications network, such as but not limited to NFC.

As may be appreciated, biometric reference templates 206 may include a wide variety of biometric reference information pertaining to a user that will be subject to biometric authentication by authentication device 102. With this in mind, contextual information in an attestation signal from authentication device 102 may indicate that sensors 212 are capable of only obtaining certain types of biometric test information. In such instances, CAM 207 when executed may cause client device 101 to limit the biometric reference information contained in biometric reference templates transferred to authentication device 102 to the type of biometric test information that may be obtained using sensors 212.

For example, memory 203 of client device 201 may store a biometric reference template containing iris information of a user and a biometric reference template containing DNA information of a user. Contextual information in an attestation signal from authentication device 102 may indicate that authentication device 102 only includes an iris scanner as sensor(s) 212. As a result, client device 101 may permit the biometric reference template containing iris information to be transmitted to authentication device 102, but may prevent the transmission of the biometric reference template containing DNA information. In this way, biometric reference information provided to authentication device is limited to the type of information that the type of biometric test information is capable of obtaining with its available sensors.

Figure 3:
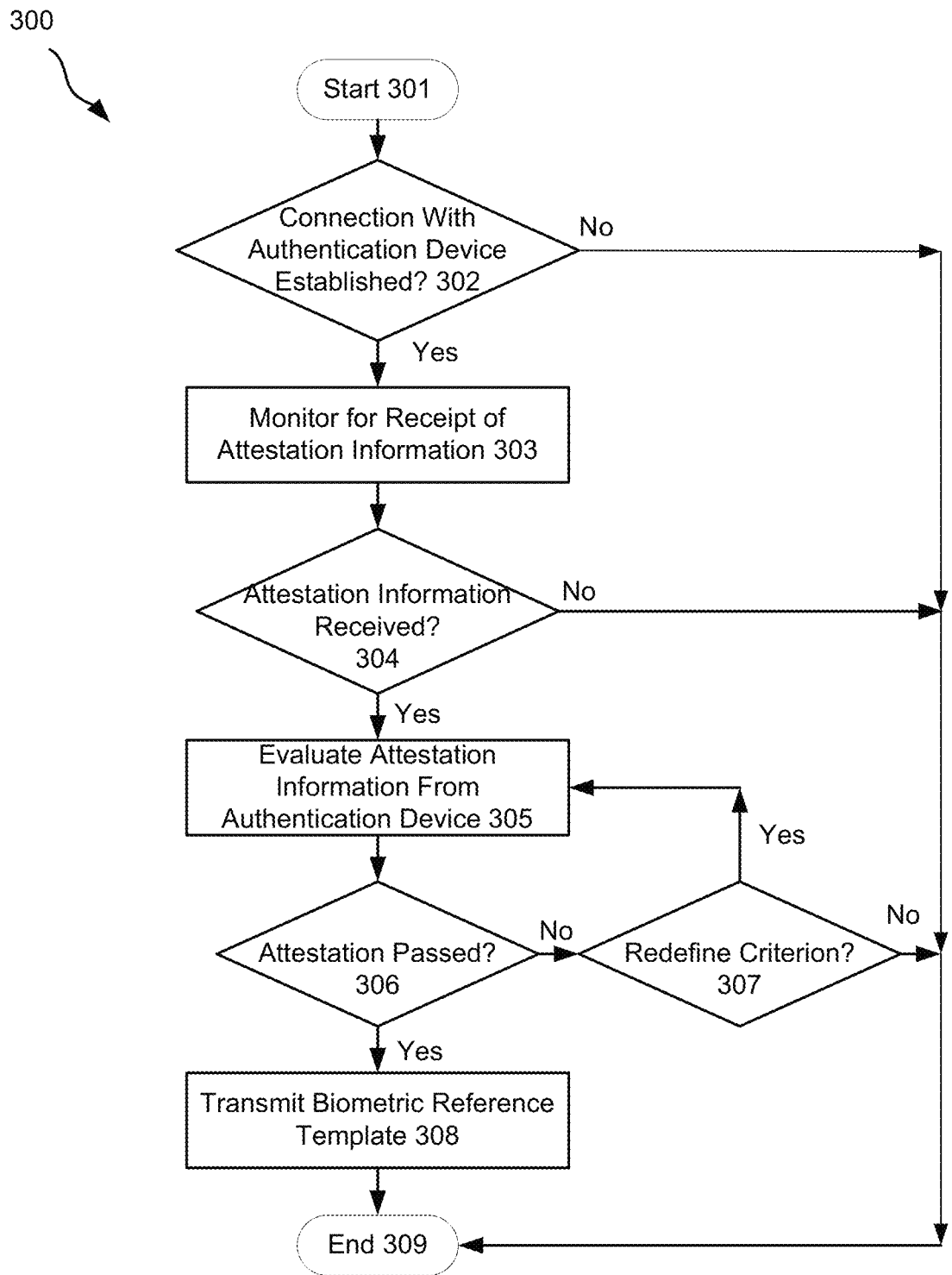
FIG. 3 is a flow diagram of an example of a method of providing biometric reference templates from a client device to an authentication device consistent with the present disclosure.

The foregoing operations of client device 101 are generally illustrated in FIG. 3, which depicts an example flow diagram of a method of providing a biometric authentication template from a client device to an authentication device. As shown, method 300 begins a block 301. At block 302, a determination may by a client device as to whether a connection (e.g., communications channel) has been established with an authentication device, e.g., within an allotted period of time. If not, the method may proceed to block 309 and end.

Once a connection with an authentication device has been established, the method may proceed to block 303, wherein the client device may monitor for the receipt of attestation information from the authentication device. For example, CAM 207 may cause device 101 to monitor I/O 204 for the receipt of attestation information from authentication device 102.

The method may then proceed to block 304, wherein a determination may be made as to whether the client device has received attestation information from an authentication device within an allotted time period. If not, the method may proceed to block 309 and end. But if attestation information is received the method may proceed to block 305, wherein the client device may evaluate the capabilities of the authentication device based on the received attestation information, as generally described above. More specifically, CAM 207 when executed may cause client device 101 to evaluate the attestation information received from an authentication device to determine whether the authentication device can be trusted to store biometric reference templates in an adequate protected environment, and to enforce a suitable temporary storage policy. This determination may depend in part on the client device's verification of an EPID/DAA private key that may have been used by authentication device 102 to sign the attestation information. The determination may also depend in whole or in part on a comparison by the client device of criterion specified in a biometric authentication initiation signal (BAIS) previously sent by the client device to the authentication device (not shown).

At block 306, a determination may be made by the client as to whether attestation of the authentication device has passed. If attestation fails, the method may proceed to block 307, wherein a determination may be made as to whether the criterion for an acceptable protected environment and/or temporary storage policy will be changed. If not, the method proceeds to block 309 and ends. If so, the criterion for successful attestation are changed by the client device and the method loops back to block 305.

Once attestation passes, the method may proceed from block to block 308, wherein the client device transmits biometric reference templates to the authentication device using any suitable form communication, as previously discussed. Once the relevant biometric reference templates are transmitted to the authentication device, the method may proceed to block 309 and end.

Returning to FIG. 2, in response to receiving one or more biometric reference templates from client device 101, authentication device 102 may be configured to perform certain operations, including biometric template storage operations, biometric authentication operations, and temporary storage operations consistent with the present disclosure. More specifically, in response to the receipt of one or more biometric reference templates, ADAM 215 when executed may cause authentication device 102 to store the received biometric reference template(s) in its protected environment(s). For example, ADAM 215 when executed may cause authentication device 102 to store received biometric reference templates in TEE 213, memory enclave 214, or a combination thereof.

Once received biometric reference templates have been stored in a protected environment, ADAM 215 when executed may cause authentication device to execute a biometric authentication protocol to verify the identity of a user requesting access to a system or services protected by authentication device 102. In some embodiments, execution of the biometric authentication protocol may begin with the appropriate selection of sensor(s). In this regard, ADAM 215 when executed may cause authentication device 102 to determine the type and nature of the biometric reference information contained in the biometric reference templates received from client device 101. Based on this analysis, ADAM 215 when executed may cause authentication device 102 to select which sensor(s) 212 it will use to biometrically authenticate the user.

For example, a biometric reference template received from client device 101 may includes iris information only, yet sensors 212 of authentication device 102 may include an iris scanner and a thumb print reader. In such instances, ADAM 215 may cause authentication device to use the iris scanner to biometrically authenticate a user, as the iris scanner is capable of obtaining biometric test information that is consistent with the biometric reference data in the biometric reference template. Of course, the selection of appropriate sensors may be omitted, particularly when sensors 212 include a single sensor type.

In any case, ADAM 215 when executed may cause authentication device 102 to attempt to biometrically verify the identity of a user any or all of the sensors available to it (e.g., sensor(s) 212). If biometric authentication using one type of sensor fails, authentication device may attempt to use another available sensor, or the method may fail. But if biometric authentication of the user succeeds, ADAM 215 when executed may cause authentication device 102 to establish an authenticated session, during which the user may be permitted to access systems and/or resources protected by authentication device 102.

Once an authenticated session is established, authentication device 102 may be further configured to maintain the authenticated session until the occurrence of one or more termination events. As will be described in detail below, termination events may include but are not limited to the expiration of a predetermined time period (timeout), failure of authentication device 102 to detect client device 101, failure of authentication device 102 to detect the presence of a user (i.e., failure to detect human presence), failure of the authentication device to verify the presence of the authenticated user (i.e., failure to detect the specific authenticated user); failure of authentication device 102 to maintain a specified degree of confidence that the authenticated user is present, combinations thereof and the like.

In this regard, ADAM 215 when executed may cause authentication device 102 to monitor for the occurrence of a termination event. Such monitoring may be performed in any suitable manner, such as in a manner that may enable authentication device 102 to detect the example termination events types specified above. For example, ADAM 215 when executed may cause authentication device 102 to monitor a timer that is set up upon the establishment of an authenticated session. The timer may define a specific time period that the authenticated session will remain open. Running of the timer in some embodiments may be conditioned on the failure of authentication device 102 to detect user interaction with electronic and/or physical resources it protects. In any case, authentication device 102 may be configured to consider the expiration of the timer to be a termination event.

Alternatively or additionally, ADAM 215 when executed may cause authentication device 102 to monitor for the presence of client device 101. In this regard, authentication device 102 may be configured to leverage its available resources such as I/O 211 to detect the presence of client device 101. For example, authentication device 102 may use I/O 211 to monitor for the existence of a communications link/channel with client device 101. In such instances, the presence of a communications/link channel with client device 101 may be considered an indicator that client device 101 is present, particularly if the communication channel is established using a form of close range communication such as NFC. Conversely, failure of I/O 211 to detect the existence of a communications channel/link with client device 101 may be considered an indicator that client device 101 is not present. Authentication device 102 may also use sensors 212 to detect the presence of client device 101.

For example, where sensors 212 include a camera, authentication device may use the camera to capture an image of its surroundings, and then use an image recognition protocol to analyze the resulting images in an attempt to identify client device 101. Identification of client device 101 in the image may be considered an indicator that client device 101 is present, whereas failure to identify client device 101 in the image may be considered an indicator that client device is not present. In any case, authentication device 102 may consider a failure to detect client device 101 a termination event.

Authentication device 102 may also be configured to monitor for the presence of a human being once an authenticated session has been established. In this regard, ADAM 215 when executed may cause authentication device 102 to monitor for the presence of a human in any suitable manner. For example, ADAM 215 may cause authentication device 102 to monitor for inputs made with one or more input devices (e.g., keyboard, mouse, touch screen, etc.) coupled to electronic resources that authentication device 102 protects. Detection of inputs made through such input devices may be considered evidence that a human being is present, whereas a lack of such inputs may be considered evidence that a human being is not present.

Similarly, authentication device 102 may be configured to use sensor(s) 102 to detect the presence of a human. For example, where sensor(s) 102 include a camera, microphone, pressure sensor, accelerometer, gyroscope, etc., ADAM 215 when executed may cause authentication device to use such sensors in an attempt to gather evidence of the presence of a human. Such evidence may include, for example, noises detected by a microphone consistent with human presence, images captured by a camera that show a human being, data from an accelerometer, gyroscope, etc., that is consistent or inconsistent with the presence of a human, combinations thereof, and the like. Authentication device 102 may also detect human presence by requesting that a particular action be performed. For example, authentication device 102 may be configured to display an interactive button on a screen thereof, and ask the user to periodically interact with the button to verify human presence.

In any case, ADAM 215 when executed may cause authentication device to analyze evidence of human presence (or lack thereof), and make an inference as to whether a human is present at the system/resources that authentication device 102 protects. If the weight of the evidence suggests that a human is not present, authentication device 102 may consider this fact to constitute a termination event.

Authentication device 102 may also be configured to periodically or continuously monitor for the presence of a specific human being, such as the user that was authorized with the biometric reference templates provided by client 101. Periodic or continuous monitoring of specific user presence may be performed in any suitable manner. For example, ADAM 215 when executed may cause authentication device 102 to utilize available resources such as I/O 211 and sensor(s) 212 to determine whether a specific authenticated user is still present. In some embodiments, this continuous monitoring may be performed using the same biometric protocol and reference templates that were used to initially authenticate the user. Such a method may be particularly useful when the biometric authentication methodology relies on biometric test information that can be obtained with limited or no user action, such as facial recognition, eye/iris recognition, etc.

Alternatively or additionally, authentication device 102 may be configured to gather contextual data that supports or cuts against the presence of a specific human using its available resources, and make a determination as to whether the user is present or not based on a confidence level that is determined from such data. In this regard, authentication device 102 may include a continuous authentication confidence module (CACM; not shown), which may be stored in memory 210 and/or a memory within TEE 213 and/or memory enclave 214. The CACM may be configured to determine a confidence level that is reflective of the degree of confidence it has that a specific human (e.g., a human biometrically authenticated by authentication device 102) is present while an authenticated session is active.

The CACM may determine the confidence level by causing authentication device 102 to gather contextual data that supports or cuts against the likelihood that a specific human is still present. Contextual data may include but is not limited to biometric information, specific habits, personal information, activities, computing environments, relationships (e.g., with people, places or things), user devices including computing devices, physical environment, information captured from sensors such as sensor(s) 212 (or inferences drawn from that information), preferences, patterns of behavior, and/or any other information useful in identifying the specific human or predicting an activity of the specific human.

The CACM may be further configured to cause authentication device 102 to gather presence evidence, e.g., using sensors 212 or other components such as I/O 211. Presence evidence includes evidence of the presence of a human ("human presence evidence") as well as evidence of the presence of a specific human ("specific human presence evidence")

The operations of the CACM may be initiated in response to an initial biometric authentication of a human that, e.g., initiates an authenticated session. Once an authenticated session is established, the CACM may be configured to assign an initial confidence level based on the initial successful biometric authentication. The initial confidence level may also be configured to decay at a rate that may be related to one or more factors, such as contextual data, history of the human that was initially authenticated, behavior of the human that was initially authenticated, the environment, perceived risk, etc.

Once the initial confidence level is set, the CACM may dynamically adjust the confidence level based on available contextual data and/or presence evidence that is periodically or continuously obtained by authentication device 102. The CACM may apply contextual data and/or presence evidence supporting a determination that the human that was initially biometrically authenticated by authentication device 102 to adjust the confidence level upwards. Conversely, the CACM may apply contextual data and/or presence evidence suggesting that the authenticated human is not presence to adjust the confidence level downwards. The degree to which the confidence level is adjusted upwards or downwards may depend on a weighting value assigned to contextual data and/or presence evidence, with relatively strong evidence/data being applied by the CACM to increase/decrease the confidence level to a greater degree than relatively weak evidence/data.

The CACM may be further configured to adjust its operation based on whether the confidence level exceeds or falls below one or more threshold confidence levels. For example, the CACM may set a first, second and third threshold confidence levels. When the confidence level is above the first threshold level, the CACM may be configured to use low power sensors to obtain presence evidence and locally available contextual data to update the confidence level. If the confidence level decreases below the first threshold but is above the second threshold level, the CACM may elect to us higher power sensors (e.g., a camera, facial recognition, etc.) to obtain presence evidence. In addition, the CACM may attempt to connect with remote computing resources such as a database server to obtain additional contextual data that may be useful in its monitoring for the presence of the human initially biometrically authenticated by device 102.

If the confidence level falls below the second threshold level, the CACM may be configured to cause authentication device to attempt to obtain active presence evidence. Active presence evidence is evidence that requires an action from a human, such as the human initially authenticated by authentication device 102. For example, the CACM may cause authentication device to request a specific user action, such as the entry of a user name and/or password, biometric reauthentication of the user, etc. If the confidence level falls below the third threshold, the CACM may report such occurrence to ADAM 215 as a termination event.

Authentication device 102 may be further configured to perform certain operations upon the detection of a termination event. For example, ADAM 215 when executed may cause authentication device 102 to perform session termination operations and biometric reference template deletion operations consistent with the present disclosure. More specifically, upon the occurrence of a termination event, ADAM 215 may cause authentication device 102 to terminate a pending authenticated session, and to delete any biometric reference templates from its protected environments. By way of example, authentication device 102 may store biometric reference templates 206 received from client device 101 in TEE 213 and/or memory enclave 214. Upon successful biometric authentication of a user with such templates, authentication device 102 may establish an authenticated session and monitor for the occurrence of a termination event, as previously described. Upon the detection of a termination event, authentication device 102 may terminate the authenticated session and delete biometric reference templates from TEE 213 and/or memory enclave 214. As a result, biometric reference templates of a user may be only temporarily stored on authentication device 102.

Figure 4:
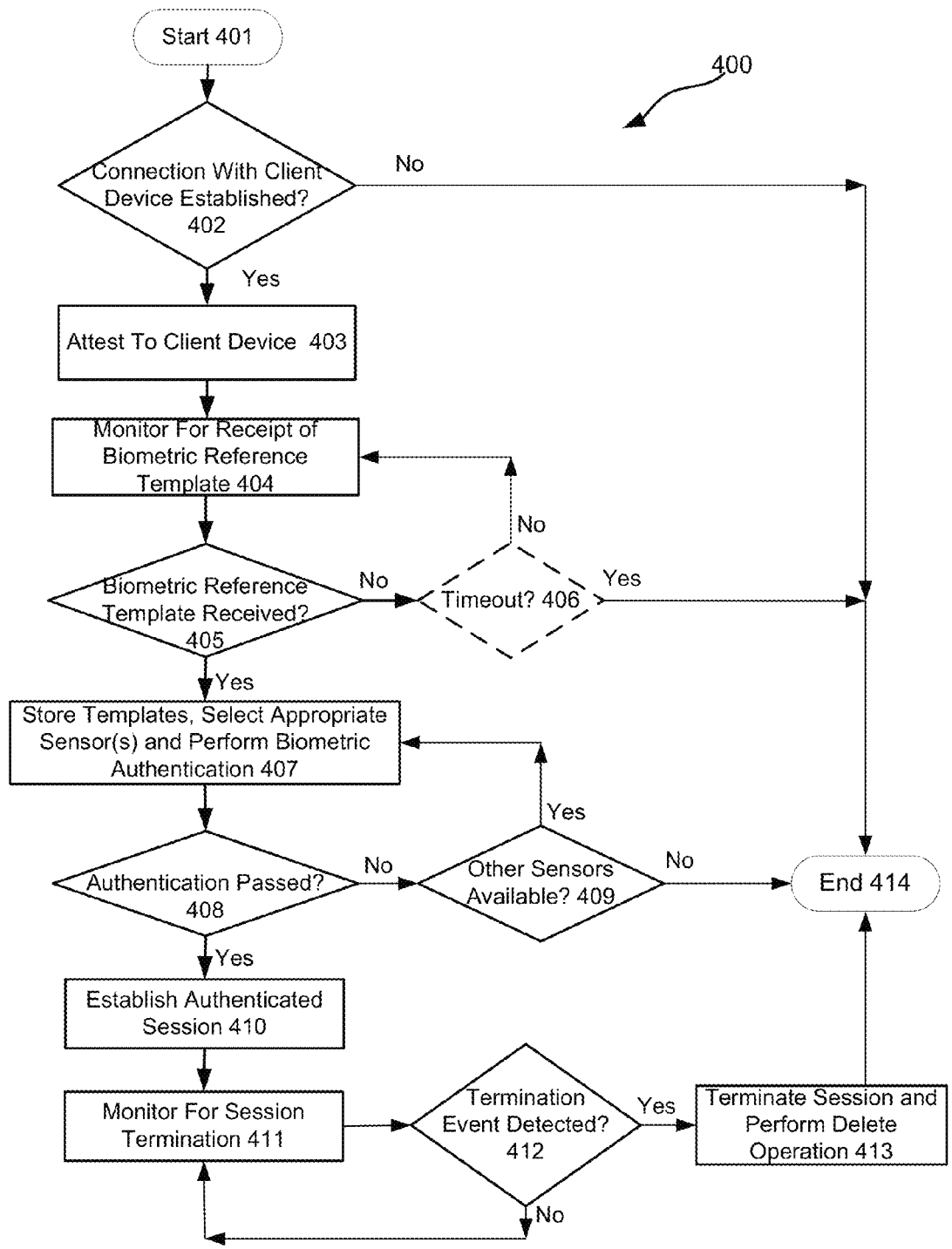
FIG. 4 is a flow diagram illustrating an example of a method of performing biometric authentication with an authentication device consistent with the present disclosure.

Another aspect of the present disclosure relates to a method of performing biometric authentication with an authentication device consistent with the present disclosure. Reference is therefore made to FIG. 4, which depicts a flow diagram of an example biometric authentication method consistent with the present disclosure. It is noted that details of many operations of the method illustrated in FIG. 54 have been previously described. Accordingly, the operations performed pursuant to this method will not be reiterated in detail.

As shown, method 400 begins at block 401. At block 402, a determination may be made by an authentication device as to whether a connection with a client device has been established. If a connection with a client device has not been established, the method may proceed to block 414 and end. If a connection with a client device has been established, the method may proceed to block 403, wherein the authentication device attests its protected environment and/or temporary storage policy to the client device. As noted previously, attestation by the authentication device may be in response to the receipt of a biometric authentication initiation signal (BAIS) from the client device.

The method may then proceed to block 404, wherein the authentication device monitors for the receipt of biometric reference templates from the client device. As noted previously, client device may condition the transmission of biometric reference templates on successful attestation of the authentication device's protected environment and/or temporary storage policy. At block 405, a determination may be made by the authentication device as to whether one or more biometric templates have been received. If receipt of such templates is scheduled to occur within an allotted time period and the templates have not been received, the method may proceed to optional block 406, wherein a determination is made as to whether the allotted time has expired. If the allotted time has not expired, the method may return to block 404. But if the allotted time has expired (or if a time limit was not established for receipt of biometric reference templates), the method may proceed to block 414 and end. Alternatively or additionally, the method pursuant to block 406 may prompt a user and/or a client device to retry sending the biometric templates (not shown). In such instances, the method may permit a fixed number of retries, log an error, or a combination thereof before proceeding to block 414 and ending.

Upon receipt of one of more biometric templates from a client device, the method may proceed to block 407. Pursuant to this block, the authentication device may store received biometric templates in an appropriate protected environment. In addition, the authentication device may analyze the received biometric templates and select appropriate sensors for the collection of biometric test information for use in a biometric authentication operation. The authentication device will then attempt to perform biometric authentication of a user using the biometric reference template and biometric test information that obtained with the selected sensor(s).

At block 408, a determination may be made as to whether biometric authentication operation of the user succeeded. If not, the method may proceed to block 409, wherein a determination is made as to whether other sensors are available to the authentication device and could be used to perform biometric authentication of the user. If so, the method may loop back to block 407, and the authentication device may attempt to biometrically authenticate the user with the newly selected sensor(s). If no additional sensors are available to the authentication device (e.g., where prior iterations of operations pursuant to block 408 relied on all sensor(s) 212 in one or multiple iterations), the method may proceed to block 414 and end. In some embodiments, all the sensors that may be need to satisfy a multi-factoral biometric authentication policy are used in a single iteration of the operations of block 408.

If biometric authentication of the user performed in block 408 succeeds, the method may proceed to block 410. Pursuant to such block, the authentication device may establish an authenticated session, whereupon the user may be permitted to access resources that the authentication device protects. The method may then proceed to block 411, wherein the authentication device periodically or continuously monitors for the occurrence of a termination event. At block 412, a determination is made as to whether the authentication device has detected a termination event. If not, the method may loop back to block 411, whereupon the authentication device continues to monitor for a termination event while maintain the authenticated session.

Upon detection of a termination event, the method may proceed to block 413, wherein the authentication device terminates the authenticated session and deletes the biometric reference templates stored in its protected environment according to its temporary storage policy. Once the biometric reference templates are deleted, the method may proceed to block 414 and end.

As may be appreciated by the foregoing description, the biometric authentication technology described herein may enable the performance of biometric authentication operations using biometric templates that are only temporarily stored on an authentication device, and which are deleted upon the occurrence of a termination event. Permanent or substantially permanent storage of biometric reference templates may be limited to a client device that remains under control of an individual, preferably the individual that is the target of the biometric authentication operations. This may enhance the users control over the biometric reference templates, thereby lowering or eliminating privacy concerns associated with traditional biometric authentication systems.

Accordingly, one example of the present disclosure is an authentication device including a processor and a memory configured to store a biometric reference template, the biometric reference template including biometric reference information of a human; and a client authentication module (CAM) configured to evaluate attestation information received from an authentication device and determine whether the authentication device includes a protected environment meeting at least one first predetermined criterion for temporary storage of the biometric reference template, the CAM further configured to permit transmission of the biometric reference template to the authentication device if the protected environment meets the first predetermined criterion.

Another example client device includes any or all of the foregoing components, wherein the CAM is further configured to deny transmission of the biometric reference template to the authentication device is the protected environment does not meet the at least one first predetermined criterion.

Another example client device includes any or all of the foregoing components, wherein the CAM is further configured to initiate a connection with the authentication device.

Another example client device includes any or all of the foregoing components, wherein the at least one first predetermined criterion includes a collection of predetermined acceptable and unacceptable protected environments and information regarding the authentication device's ability to hold said biometric reference template in confidence and the client authentication module evaluates the attestation information by comparing the attestation information to the collection of predetermined acceptable and unacceptable protected environments and the authentication device's ability to hold said biometric reference template in confidence.

Another example client device includes any or all of the foregoing components, wherein the CAM is further configured to determine whether the authentication device is configured to execute a temporary storage policy meeting at least one second predetermined criterion, the temporary storage policy defining parameters for the temporary storage and deletion of biometric reference templates from the protected environment, the client authentication module further configured to permit transmission of the biometric reference template if the temporary storage policy meets the at least one second predetermined criterion.

Another example client device includes any or all of the foregoing components, wherein the CAM is further configured to deny transmission of the biometric reference template if the temporary storage policy does not meet the at least one second predetermined criterion.

Another example client device includes any or all of the foregoing components, and further includes input output circuitry configured to communicate with the authentication device using close range communication, long range communication, or a combination thereof.

Another example client device includes any or all of the foregoing components, wherein the input output circuitry is configured to communicate with the authentication device using near field communication, radio frequency identification, a personal area network, or a combination thereof.

Another example client device includes any or all of the foregoing components, wherein the CAM is further configured to verify the authenticity of a private identification key used to sign the attestation information.

Another example client device includes any or all of the foregoing components, wherein the protected environment is selected from a trusted execution environment, a memory enclave, and a combination thereof.

Another example of the presence disclosure is an authentication device including a processor; a memory; a protected environment; and an authentication device attestation module (ADAM), wherein the ADAM is configured to: store a biometric reference template received from a client device in the protected environment; biometrically authenticate a human with the biometric reference template stored in the protected environment; establish an authenticated session if biometric authentication of the human is successful; and delete the biometric reference template upon the detection of a termination event.

Another example authentication device includes any or all of the foregoing components, wherein the ADAM is further configured to transmit attestation information to the client device, the attestation information including information about the protected environment.

Another example authentication device includes any or all of the foregoing components, wherein the attestation information further including information about a temporary storage policy executed by the authentication device.

Another example authentication device includes any or all of the foregoing components, wherein the biometric authentication is further performed using biometric test information obtained from the human using at least one sensor.

Another example authentication device includes any or all of the foregoing components, and further includes a sensor configured to obtain biometric test information from the human, the CAM further configured to perform the biometric authentication using the biometric test information and the biometric reference template stored in the protected environment.

Another example authentication device includes any or all of the foregoing components, and further includes a plurality of sensors configured to obtain biometric test information from the human, wherein the CAM is further configured to: determine the type of biometric reference information contained in the biometric reference template; select a first subset of the plurality of sensors capable of obtaining biometric test information of a type corresponding to the biometric reference information; obtain the biometric test information from the human with the first subset of the plurality of sensors; and perform the biometric authentication of the human with the biometric test information and the biometric reference template stored in the protected environment.

Another example authentication device includes any or all of the foregoing components, wherein if the biometric authentication device fails, the CAM is further configured to: select a second subset of the plurality of sensors capable of obtaining biometric test information of a type corresponding to the biometric reference information; obtain the biometric test information from the human with the second subset of the plurality of sensors; and perform the biometric authentication of the human with the biometric test information and the biometric reference template stored in the protected environment.

Another example authentication device includes any or all of the foregoing components, wherein the termination event is selected from the expiration of a predetermined time period, failure of the authentication device to detect the client device, failure of the authentication device to detect a human presence, failure of the authentication device to verify the presence of the human, failure of the authentication device maintain a specified degree of confidence that the human is present, failure of the biometric authentication of the human, and combinations thereof.

Another example authentication device includes any or all of the foregoing components, wherein the ADAM is further configured to monitor for the occurrence of the termination event.

Another example authentication device includes any or all of the foregoing components, wherein the protected environment is selected from a trusted execution environment, a memory enclave, and combinations thereof.

Another example authentication device includes any or all of the foregoing components, and further includes input output circuitry configured to communicate with the client device using close range communication, long range communication, or a combination thereof.

Another example authentication device includes any or all of the foregoing components, wherein the input output circuitry is configured to communicate with the client device using near field communication, radio frequency identification, a personal area network, or a combination thereof.

Another example authentication device includes any or all of the foregoing components,
wherein the ADAM is further configured to sign the attestation information with a private identification key prior to transmission of the attestation information to the client device.

Another example of the present disclosure is a method of transferring a biometric template with a client device. The method includes evaluating attestation information received from an authentication device, the evaluating including determining whether the authentication device includes a protected environment meeting at least one first predetermined criterion for the temporary storage of a biometric reference template resident on the client device; and permitting the transmission of the biometric reference templates from the client device to the authentication device if the protected environment meets the at least one first predetermined criterion.

Another example method of transferring a biometric template includes any or all of the foregoing components, and further includes denying the transmission of the biometric reference templates to the authentication device is the protected environment does not meet the first criterion.

Another example method of transferring a biometric template includes any or all of the foregoing components, and further includes initiating a connection the authentication device.

Another example method of transferring a biometric template includes any or all of the foregoing components, wherein the at least one first predetermined criterion includes a collection of predetermined acceptable and unacceptable protected environments and information regarding the authentication, and information regarding the authentication device's ability to hold said biometric reference template in confidence, and said attestation information is evaluated by comparing said attestation information to said collection of predetermined acceptable and unacceptable protected environments and to said information regarding the authentication device's ability to hold said biometric reference template in confidence.

Another example method of transferring a biometric template includes any or all of the foregoing components, and further includes determining whether the authentication device is configured to execute a temporary storage policy meeting at least one second predetermined criterion, the temporary storage policy defining parameters for the temporary storage and deletion of the biometric reference template from the protected environment; and permitting transmission of the biometric reference template from the client device to the authentication device if the temporary storage policy meets the at least one predetermined second criteria.

Another example method of transferring a biometric template includes any or all of the foregoing components, and further includes denying the transmission of the biometric reference template if the temporary storage policy does not meet the at least one second predetermined criterion.

Another example method of transferring a biometric template includes any or all of the foregoing components, and further includes transmitting the biometric reference template from the client device to the authentication device using at least one of close range communication and long range communication.

Another example method of transferring a biometric template includes any or all of the foregoing components, and further includes transmitting the biometric reference template from the client device to the authentication device using at least one of near field communication, radio frequency identification, a personal area network, or a combination thereof.

Another example method of transferring a biometric template includes any or all of the foregoing components, verifying the authenticity of a private identification key used by the authentication device to sign the attestation information.

Another example method of transferring a biometric template includes any or all of the foregoing components, wherein the protected environment is selected from a trusted execution environment, a memory enclave, and a combination thereof.

Another example of the present disclosure is a method of performing biometric authentication with an authentication device. The method includes storing a biometric reference template received from a client device in a protected environment of the authentication device; biometrically authenticating a human with the biometric reference template stored in the protected environment; establishing an authenticated session if biometric authentication of the human is successful; and deleting the biometric reference template upon the detection of a termination event.

Another example method of performing biometric authentication includes any or all of the foregoing components, and further includes transmitting attestation information from the authentication device to the client device, the attestation information including information about the protected environment.

Another example method of performing biometric authentication includes any or all of the foregoing components, wherein the attestation information further includes information about a temporary storage policy executed by the authentication device.

Another example method of performing biometric authentication includes any or all of the foregoing components, and further includes including obtaining biometric test information from the human with at least one sensor of the authentication device, and biometrically authenticating the human with the authentication device using the biometric test information and the biometric reference template stored in the protected environment.

Another example method of performing biometric authentication includes any or all of the foregoing components, wherein the authentication device includes a plurality of sensors configured to obtain biometric test information from the human, the method further including: determining with the authentication device the type of biometric reference information contained in the biometric reference template; selecting with the authentication device a first subset of the plurality of sensors capable of obtaining biometric test information of a type corresponding to the biometric reference information; obtaining the biometric test information from the human with the first subset of the plurality of sensors; and biometrically authenticating the human with the authentication device using the biometric test information and the biometric reference template stored in the protected environment.

Another example method of performing biometric authentication includes any or all of the foregoing components, wherein if biometric authentication of the human with the biometric test information obtained with the first subset of the plurality of sensors fails, the method further includes selecting with the authentication device a second subset of the plurality of sensors capable of obtaining biometric test information of a type corresponding to the biometric reference information; obtaining the biometric test information from the human with the second subset of the plurality of sensors; and biometrically authenticating the human with the biometric test information obtained using with the second subset of the plurality of sensors and the biometric reference template stored in the protected environment.

Another example method of performing biometric authentication includes any or all of the foregoing components, wherein the termination event is selected from the expiration of a predetermined time period, failure of the authentication device to detect the client device, failure of the authentication device to detect a human presence, failure of the authentication device to verify the presence of the human, failure of the authentication device maintain a specified degree of confidence that the human is present, failure of the biometric authentication of the human, and combinations thereof.

Another example method of performing biometric authentication includes any or all of the foregoing components, and further includes monitoring for the occurrence of the termination event.

Another example method of performing biometric authentication includes any or all of the foregoing components, wherein the protected environment is selected from a trusted execution environment, a memory enclave, and combinations thereof.

Another example method of performing biometric authentication includes any or all of the foregoing components, and further includes receiving the biometric reference template with input output circuitry of the authentication device, wherein the input output circuitry is configured to communicate with the client device using close range communication, long range communication, or a combination thereof.

Another example method of performing biometric authentication includes any or all of the foregoing components, wherein the input output circuitry is configured to communicate with the client device using near field communication, radio frequency identification, a personal area network, or a combination thereof.

Another example method of performing biometric authentication includes any or all of the foregoing components, and further includes signing the attestation information with a private identification key prior to transmitting the attestation information to the client device from the authentication device.

Another example of the present disclosure is a biometric authentication system. The system includes a client device. The client device includes a processor; a memory configured to store a biometric reference template, the biometric reference template including biometric reference information of a human; and a client authentication module (CAM) configured to evaluate attestation information received from an authentication device and determine whether the authentication device includes a protected environment meeting at least one first predetermined criterion for temporary storage of the biometric reference template, the CAM further configured to permit transmission of the biometric reference template to the authentication device if the protected environment meets the first predetermined criterion.

Another example biometric authentication system includes any or all of the foregoing components, wherein the CAM is further configured to deny transmission of the biometric reference template to the authentication device is the protected environment does not meet the at least one first predetermined criterion.

Another example biometric authentication system includes any or all of the foregoing components, wherein the CAM is further configured to initiate a connection with the authentication device.

Another example biometric authentication system includes any or all of the foregoing components, wherein the at least one first predetermined criterion includes a collection of predetermined acceptable and unacceptable protected environments and information regarding the authentication, and information regarding the authentication device's ability to hold said biometric reference template in confidence, and said attestation information is evaluated by comparing said attestation information to said collection of predetermined acceptable and unacceptable protected environments and to said information regarding the authentication device's ability to hold said biometric reference template in confidence.

Another example biometric authentication system includes any or all of the foregoing components, wherein the CAM is further configured to determine whether the authentication device is configured to execute a temporary storage policy meeting at least one second predetermined criterion, the temporary storage policy defining parameters for the temporary storage and deletion of biometric reference templates from the protected environment, the client authentication module further configured to permit transmission of the biometric reference template if the temporary storage policy meets the at least one second predetermined criterion.

Another example biometric authentication system includes any or all of the foregoing components, wherein the CAM is further configured to deny transmission of the biometric reference template if the temporary storage policy does not meet the at least one second predetermined criterion.

Another example biometric authentication system includes any or all of the foregoing components, wherein the client device further includes input output circuitry configured to communicate with the authentication device using close range communication, long range communication, or a combination thereof.

Another example biometric authentication system includes any or all of the foregoing components, wherein the input output circuitry is configured to communicate with the authentication device using near field communication, radio frequency identification, a personal area network, or a combination thereof.

Another example biometric authentication system includes any or all of the foregoing components, wherein the CAM is further configured to verify the authenticity of a private identification key used to sign the attestation information.

Another example biometric authentication system includes any or all of the foregoing components, wherein the protected environment is selected from a trusted execution environment, a memory enclave, and a combination thereof.

Another example of the present disclosure is a biometric authentication system including an authentication device. The authentication device includes a processor; a memory; a protected environment; and an authentication device attestation module (ADAM), wherein the ADAM is configured to:

store a biometric reference template received from a client device in the protected environment; biometrically authenticate a human with the biometric reference template stored in the protected environment; establish an authenticated session if biometric authentication of the human is successful; and delete the biometric reference template upon the detection of a termination event.

Another example biometric authentication system includes any or all of the foregoing components, wherein the ADAM is further configured to transmit attestation information to the client device, the attestation information including information about the protected environment.

Another example biometric authentication system includes any or all of the foregoing components, wherein the attestation information further including information about a temporary storage policy executed by the authentication device.

Another example biometric authentication system includes any or all of the foregoing components, wherein the biometric authentication is further performed using biometric test information obtained from the human using at least one sensor.

Another example biometric authentication system includes any or all of the foregoing components, wherein the authentication device further includes a sensor configured to obtain biometric test information from the human, the CAM further configured to perform the biometric authentication using the biometric test information and the biometric reference template stored in the protected environment.

Another example biometric authentication system includes any or all of the foregoing components, wherein the authentication device further includes a plurality of sensors configured to obtain biometric test information from the human, wherein the CAM is further configured to: determine the type of biometric reference information contained in the biometric reference template; select a first subset of the plurality of sensors capable of obtaining biometric test information of a type corresponding to the biometric reference information; obtain the biometric test information from the human with the first subset of the plurality of sensors; and perform the biometric authentication of the human with the biometric test information and the biometric reference template stored in the protected environment.

Another example biometric authentication system includes any or all of the foregoing components, wherein if the biometric authentication device fails, the CAM is further configured to: select a second subset of the plurality of sensors capable of obtaining biometric test information of a type corresponding to the biometric reference information; obtain the biometric test information from the human with the second subset of the plurality of sensors; and perform the biometric authentication of the human with the biometric test information and the biometric reference template stored in the protected environment.

Another example biometric authentication system includes any or all of the foregoing components, wherein the termination event is selected from the expiration of a predetermined time period, failure of the authentication device to detect the client device, failure of the authentication device to detect a human presence, failure of the authentication device to verify the presence of the human, failure of the authentication device maintain a specified degree of confidence that the human is present, failure of the biometric authentication of the human, and combinations thereof.

Another example biometric authentication system includes any or all of the foregoing components, wherein the ADAM is further configured to monitor for the occurrence of the termination event.

Another example biometric authentication system includes any or all of the foregoing components, wherein the protected environment is selected from a trusted execution environment, a memory enclave, and combinations thereof.

Another example biometric authentication system includes any or all of the foregoing components, wherein the authentication device further includes input output circuitry configured to communicate with the client device using close range communication, long range communication, or a combination thereof.

Another example biometric authentication system includes any or all of the foregoing components, wherein the input output circuitry is configured to communicate with the client device using near field communication, radio frequency identification, a personal area network, or a combination thereof.

Another example biometric authentication system includes any or all of the foregoing components, wherein the ADAM is further configured to sign the attestation information with a private identification key prior to transmission of the attestation information to the client device.

Another example of the present disclosure is a biometric authentication system that includes means for performing any or all of the method operations described herein.

Another example of the present disclosure is at least one computer readable medium including computer readable client authentication module (CAM) instructions stored therein, wherein the CAM instructions when executed by a processor of client device cause the client device to perform the following operations including: evaluating attestation information received from an authentication device, the evaluating including determining whether the authentication device includes a protected environment meeting at least one first predetermined criterion for the temporary storage of a biometric reference template resident on the client device; and permitting the transmission of the biometric reference templates from the client device to the authentication device if the protected environment meets the at least one first predetermined criterion.

Another example at least one computer readable medium includes any or all of the foregoing components, wherein the CAM instructions when executed by the processor further cause the client device to perform the following operation including: denying the transmission of the biometric reference templates to the authentication device is the protected environment does not meet the first criterion.

Another example at least one computer readable medium includes any or all of the foregoing components, wherein the CAM instructions when executed by the processor further cause the client device to perform the following operation including: initiating a connection the authentication device.

Another example at least one computer readable medium includes any or all of the foregoing components, wherein the at least one first predetermined criterion includes a collection of predetermined acceptable and unacceptable protected environments and information regarding the authentication, and information regarding the authentication device's ability to hold said biometric reference template in confidence, and said attestation information is evaluated by comparing said attestation information to said collection of predetermined acceptable and unacceptable protected environments and to said information regarding the authentication device's ability to hold said biometric reference template in confidence.

Another example at least one computer readable medium includes any or all of the foregoing components, wherein the CAM instructions when executed by the processor further cause the client device to perform the following operation including: determining whether the authentication device is configured to execute a temporary storage policy meeting at least one second predetermined criterion, the temporary storage policy defining parameters for the temporary storage and deletion of the biometric reference template from the protected environment; and permitting transmission of the biometric reference template from the client device to the authentication device if the temporary storage policy meets the at least one predetermined second criteria.

Another example at least one computer readable medium includes any or all of the foregoing components, wherein the CAM instructions when executed by the processor further cause the client device to perform the following operation including: denying the transmission of the biometric reference template if the temporary storage policy does not meet the at least one second predetermined criterion.

Another example at least one computer readable medium includes any or all of the foregoing components, wherein the CAM instructions when executed by the processor further cause the client device to perform the following operation including: transmitting the biometric reference template from the client device to the authentication device using at least one of close range communication and long range communication.

Another example at least one computer readable medium includes any or all of the foregoing components, wherein the CAM instructions when executed by the processor further cause the client device to perform the following operation including: transmitting the biometric reference template from the client device to the authentication device using at least one of near field communication, radio frequency identification, a personal area network, or a combination thereof.

Another example at least one computer readable medium includes any or all of the foregoing components, wherein the CAM instructions when executed by the processor further cause the client device to perform the following operation including: verifying the authenticity of a private identification key used by the authentication device to sign the attestation information.

Another example at least one computer readable medium includes any or all of the foregoing components, wherein the protected environment is selected from a trusted execution environment, a memory enclave, and a combination thereof.

Another example of the present disclosure is at least one computer readable medium having computer readable authentication device attestation module (ADAM) instructions stored thereon, wherein the ADAM instructions when executed by the processor of an authentication device cause the authentication device to perform the following operations including: storing a biometric reference template received from a client device in a protected environment of the authentication device; biometrically authenticating a human with the biometric reference template stored in the protected environment; establishing an authenticated session if biometric authentication of the human is successful; and deleting the biometric reference template upon the detection of a termination event.

Another example at least one computer readable medium includes any or all of the foregoing components, wherein the ADAM instructions when executed by the processor further cause the authentication device to perform the following operations including: transmitting attestation information from the authentication device to the client device, the attestation information including information about the protected environment.

Another example at least one computer readable medium includes any or all of the foregoing components, wherein the attestation information further includes information about a temporary storage policy executed by the authentication device.

Another example at least one computer readable medium includes any or all of the foregoing components, wherein the ADAM instructions when executed by the processor further cause the authentication device to perform the following operations including: obtaining biometric test information from the human with at least one sensor of the authentication device, and biometrically authenticating the human with the authentication device using the biometric test information and the biometric reference template stored in the protected environment.

Another example at least one computer readable medium includes any or all of the foregoing components, wherein the authentication device includes a plurality of sensors configured to obtain biometric test information from the human, and the ADAM instructions when executed by the processor further cause the authentication device to perform the following operations including: determining with the authentication device the type of biometric reference information contained in the biometric reference template; selecting with the authentication device a first subset of the plurality of sensors capable of obtaining biometric test information of a type corresponding to the biometric reference information; obtaining the biometric test information from the human with the first subset of the plurality of sensors; and biometrically authenticating the human with the authentication device using the biometric test information and the biometric reference template stored in the protected environment.

Another example at least one computer readable medium includes any or all of the foregoing components, wherein if biometric authentication of the human with the biometric test information obtained with the first subset of the plurality of sensors fails, the ADAM instructions when executed by the processor further cause the authentication device to perform the following operations including: selecting with the authentication device a second subset of the plurality of sensors capable of obtaining biometric test information of a type corresponding to the biometric reference information; obtaining the biometric test information from the human with the second subset of the plurality of sensors; and biometrically authenticating the human with the biometric test information obtained using with the second subset of the plurality of sensors and the biometric reference template stored in the protected environment.

Another example at least one computer readable medium includes any or all of the foregoing components, wherein the termination event is selected from the expiration of a predetermined time period, failure of the authentication device to detect the client device, failure of the authentication device to detect a human presence, failure of the authentication device to verify the presence of the human, failure of the authentication device maintain a specified degree of confidence that the human is present, failure of the biometric authentication of the human, and combinations thereof.

Another example at least one computer readable medium includes any or all of the foregoing components, wherein the ADAM instructions when executed by the processor further cause the authentication device to perform the following operations including: monitoring for the occurrence of the termination event.

Another example at least one computer readable medium includes any or all of the foregoing components, wherein the protected environment is selected from a trusted execution environment, a memory enclave, and combinations thereof.

Another example at least one computer readable medium includes any or all of the foregoing components, wherein the ADAM instructions when executed by the processor further cause the authentication device to perform the following operations including: receiving the biometric reference template with input output circuitry of the authentication device, wherein the input output circuitry is configured to communicate with the client device using close range communication, long range communication, or a combination thereof.

Another example at least one computer readable medium includes any or all of the foregoing components, wherein the input output circuitry is configured to communicate with the client device using near field communication, radio frequency identification, a personal area network, or a combination thereof.

Another example at least one computer readable medium includes any or all of the foregoing components, wherein the ADAM instructions when executed by the processor further cause the authentication device to perform the following operations including: signing the attestation information with a private identification key prior to transmitting the attestation information to the client device from the authentication device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A client device, comprising:
 a processor;
 a memory configured to store a biometric reference template, the biometric reference template comprising biometric reference information of a human; and
 a client authentication module (CAM) configured to:
  transmit a biometric authentication initiation signal (BAIS) to an authentication device, wherein the BAIS:
   specifies requirements of a protected environment that is required by the client device for the temporary storage of a biometric template, said requirements comprising one or more of a type of protected environment, processing resources of a protected environment, memory of a protected environment, input/output resources of a protected environment, or one or more combinations thereof; and
   is configured to cause the authentication device to transmit an attestation signal to the client device, the attestation signal including attestation information that attests to characteristics of a protected environment implemented by the authentication device;
  evaluate said attestation information in said attestation signal to determine whether the characteristics of the protected environment implemented in the authentication device meet the requirements specified in said BAIS; and
 the CAM is further configured to permit transmission of the biometric reference template to the authentication device when the characteristics of the protected environment implemented in the authentication device meets the requirements specified in the BAIS.

2. The client device of claim 1, wherein the CAM is further configured to deny transmission of the biometric reference template to the authentication device when the characteristics of the protected environment implemented by the authentication device do not meet said requirements specified in the BAIS.

3. The client device of claim 1, wherein said attestation information further comprises information regarding the authentication device's ability to hold said biometric reference template in confidence, and said CAM is further configured to:
 compare said attestation information to a collection of predetermined acceptable and unacceptable protected environments;
 permit transmission of said biometric reference template to the authentication device when comparing the attestation information to said collection establishes that the protected environment implemented by the authentication device is one or more of the predetermined acceptable protected environments; and
 deny transmission of said biometric reference template to the authentication device when comparing the attestation information to said collection establishes that the protected environment implemented by the authentication device is one or more of the predetermined unacceptable protected environments.

4. The client device of claim 1, wherein:
 said BAIS is further configured to cause the authentication device to attest, in said attestation signal, to the implementation of a temporary storage policy by the protected environment implemented by said authentication device; and
 the CAM is further configured to analyze said attestation information to determine whether the temporary storage policy implemented by the protected environment is in accordance with predetermined parameters for the temporary storage and deletion of biometric reference templates from the protected environment; and
 the CAM is further configured to permit transmission of the biometric reference template when it is determined that the temporary storage policy implemented by the protected environment meets the predetermined parameters for the temporary storage and deletion of biometric reference templates.

5. The client device of claim 4, wherein the CAM is further configured to deny transmission of the biometric reference template when it is determined that the temporary storage policy implemented by the protected environment implemented on the authentication device does not meet the predetermined parameters for the temporary storage and deletion of biometric reference templates.

6. The client device of claim 1, wherein the protected environment is selected from a trusted execution environment, a memory enclave, and a combination thereof.

7. An authentication device, comprising:
 a processor;
 a memory;
 a protected environment; and
 an authentication device attestation module (ADAM), wherein the ADAM is configured to:
  transmit, in response to receipt of a biometric authentication initiation signal (BAIS) from a client device, an attestation signal containing attestation information attesting to the characteristics of a protected environment executable by the authentication device, wherein the attestation signal is configured to cause the client device to evaluate said attestation information to determine whether the characteristics of the protected environment meet requirements specified in the BAIS of a protected environment for the temporary storage of a biometric template, the requirements comprising one or more of a type of protected environment, processing resources of a protected environment, memory of a protected environment, input/output resources of a protected environment, or one or more combinations thereof;

wherein when said attestation information establishes that the characteristics of the protected environment executable on the authentication device meet the requirements specified in the BAIS, the ADAM is further configured to:

store a biometric reference template received from a client device in the protected environment;

biometrically authenticate a human with the biometric reference template stored in the protected environment;

establish an authenticated session if biometric authentication of the human is successful; and delete the biometric reference template upon the detection of a termination event.

8. The authentication device of claim 7, wherein the attestation information further comprises information about a temporary storage policy executable by the protected environment executable on authentication device.

9. The authentication device of claim 7, wherein the biometric authentication is further performed using biometric test information obtained from the human using at least one sensor.

10. The authentication device of claim 7, further comprising a sensor configured to obtain biometric test information from the human, the CAM further configured to perform the biometric authentication using the biometric test information and the biometric reference template stored in the protected environment.

11. The authentication device of claim 7, wherein the termination event is selected from the expiration of a predetermined time period, failure of the authentication device to detect the client device, failure of the authentication device to detect a human presence, failure of the authentication device to verify the presence of the human, failure of the authentication device to maintain a specified degree of confidence that the human is present, failure of the biometric authentication of the human, and combinations thereof.

12. The authentication device of claim 11, wherein said termination event comprises failure of the authentication device to maintain a specified degree of confidence that the human is present.

13. The authentication device of claim 7, wherein the protected environment is selected from a trusted execution environment, a memory enclave, and combinations thereof.

14. A method of transferring a biometric template with a client device, comprising:

transmitting a biometric authentication initiation signal (BAIS) to an authentication device, wherein the BAIS:

specifies requirements of a protected environment that is required by the client device for the temporary storage of a biometric template, said requirements comprising one or more of a type of protected environment, processing resources of a protected environment, memory of a protected environment, input/output resource of a protected environment, or one or more combinations thereof; and is configured to cause the authentication device to transmit an attestation signal to the client device, the attestation signal including attestation information that attests to characteristics of a protected environment implemented by the authentication device;

evaluating said attestation information in said attestation signal to determine whether the characteristics of the protected environment implemented in the authentication device meets the requirements specified in said BAIS; and permitting the transmission of the biometric reference template from the client device to the authentication device when the characteristics of the protected environment implemented in the authentication device meets the requirements specified in the BAIS.

15. The method of claim 14, further comprising denying the transmission of the biometric reference template to the authentication device when the characteristics of the protected environment implemented in the authentication device do not meet the requirements specified in the BAIS.

16. The method of claim 15, wherein said BAIS is further configured to cause the authentication device to attest, in said attestation signal, to the implementation of a temporary storage policy by the protected environment implemented by said authentication device; and the method further comprises:

analyzing said attestation information to determine whether the temporary storage policy implemented by the protected environment is in accordance with predetermined parameters for the temporary storage and deletion of biometric reference templates from the protected environment; and permitting transmission of the biometric reference template from the client device to the authentication device when it is determined that the temporary storage policy implemented by the protected environment meets the predetermined parameters for the temporary storage and deletion of biometric reference templates; and denying the transmission of the biometric reference template when it is determined that the temporary storage policy implemented by the protected environment does not meet the predetermined parameters for the temporary storage and deletion of the biometric reference templates.

17. The method of claim 15, wherein the protected environment is selected from a trusted execution environment, a memory enclave, and a combination thereof.

18. The method of claim 14, wherein said attestation information comprises information regarding the authentication device's ability to hold said biometric reference template in confidence, and the method further comprises:

comparing the attestation information to a collection of predetermined acceptable and unacceptable protected environments;

permitting transmission of said biometric reference template to the authentication device when comparing the attestation information to said collection establishes that the protected environment implemented by the authentication device is one or more of the predetermined acceptable protected environments; and denying transmission of said biometric reference template to the authentication device when comparing the attestation information to said collection establishes that the protected environment implemented by the authentication device is one or more of the predetermined unacceptable protected environments.

19. A method of performing biometric authentication with an authentication device, comprising:

transmitting, in response to receipt of a biometric authentication initiation signal (BAIS) from a client device, an attestation signal containing attestation information attesting to the characteristics of a protected environment executable by the authentication device, wherein the attestation signal is configured to cause the client device to evaluate said attestation information to determine whether the characteristics of the protected environment meet requirements specified in the BAIS of a protected environment for the temporary storage of a biometric template, the requirements comprising one or more of a type of protected environment, processing resources of a protected environment, memory of a protected environment, input/output resources of a protected environment, or one or more combinations thereof;

wherein when said attestation information establishes that the characteristics of the protected environment executable on the authentication device meet the requirements specified in the BAIS, the method further comprises:

storing a biometric reference template received from a client device in a protected environment of the authentication device;

biometrically authenticating a human with the biometric reference template stored in the protected environment;

establishing an authenticated session if biometric authentication of the human is successful; and deleting the biometric reference template upon the detection of a termination event.

20. The method of claim 19, further comprising obtaining biometric test information from the human with at least one sensor of the authentication device, and biometrically authenticating the human with the authentication device using the biometric test information and the biometric reference template stored in the protected environment.

21. The method of claim 19, wherein the authentication device comprises a plurality of sensors configured to obtain biometric test information from the human, the method further comprising:

determining with the authentication device the type of biometric reference information contained in the biometric reference template;

selecting with the authentication device a first subset of the plurality of sensors capable of obtaining biometric test information of a type corresponding to the biometric reference information;

obtaining the biometric test information from the human with the first subset of the plurality of sensors; and biometrically authenticating the human with the authentication device using the biometric test information and the biometric reference template stored in the protected environment.

22. The method of claim 19, wherein the termination event is selected from the expiration of a predetermined time period, failure of the authentication device to detect the client device, failure of the authentication device to detect a human presence, failure of the authentication device to verify the presence of the human, failure of the authentication device to maintain a specified degree of confidence that the human is present, failure of the biometric authentication of the human, and combinations thereof.

23. The method of claim 22, wherein said termination event comprises failure of the authentication device to maintain a specified degree of confidence that the human is present.

24. The method of claim 19, wherein the protected environment is selected from a trusted execution environment, a memory enclave, and combinations thereof.

* * * * *